March 3, 1970  J. P. KOHLS  3,498,403
VEHICLE GUIDANCE CONTROL SYSTEM
Filed Aug. 9, 1967  2 Sheets-Sheet 1
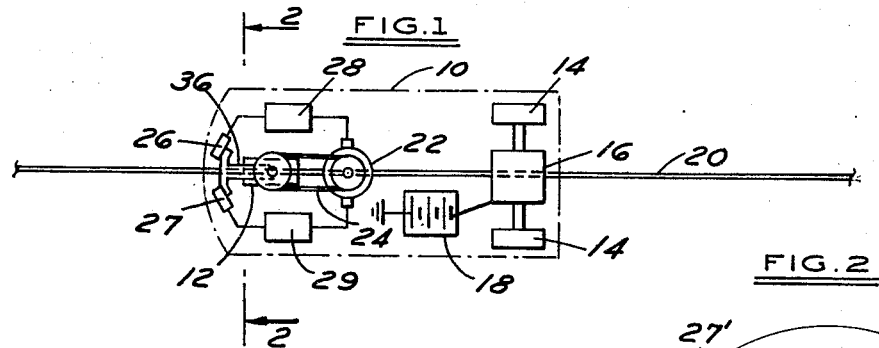
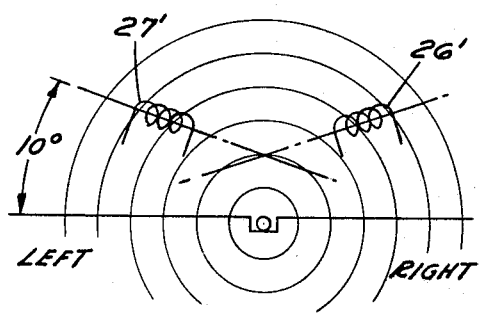
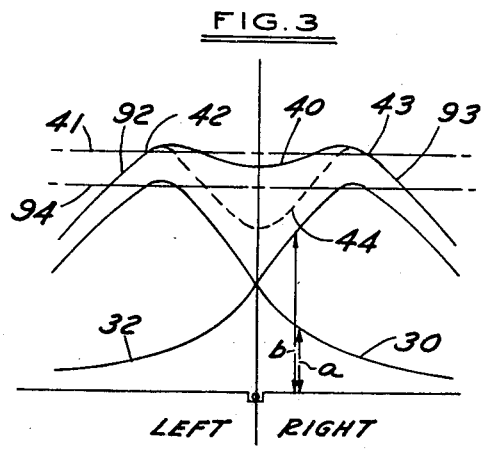
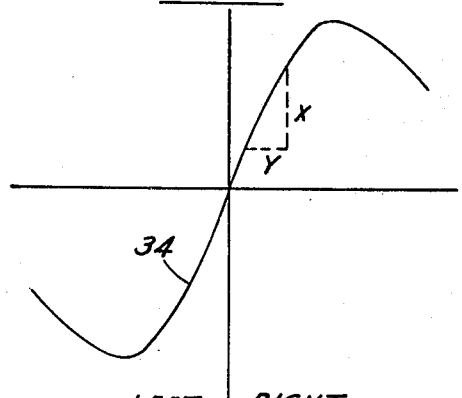
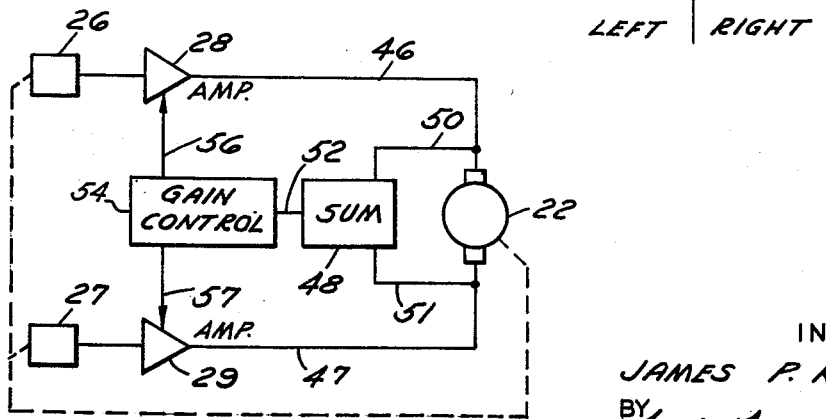
INVENTOR
JAMES P. KOHLS
BY
Farley, Forster & Farley
ATTORNEYS

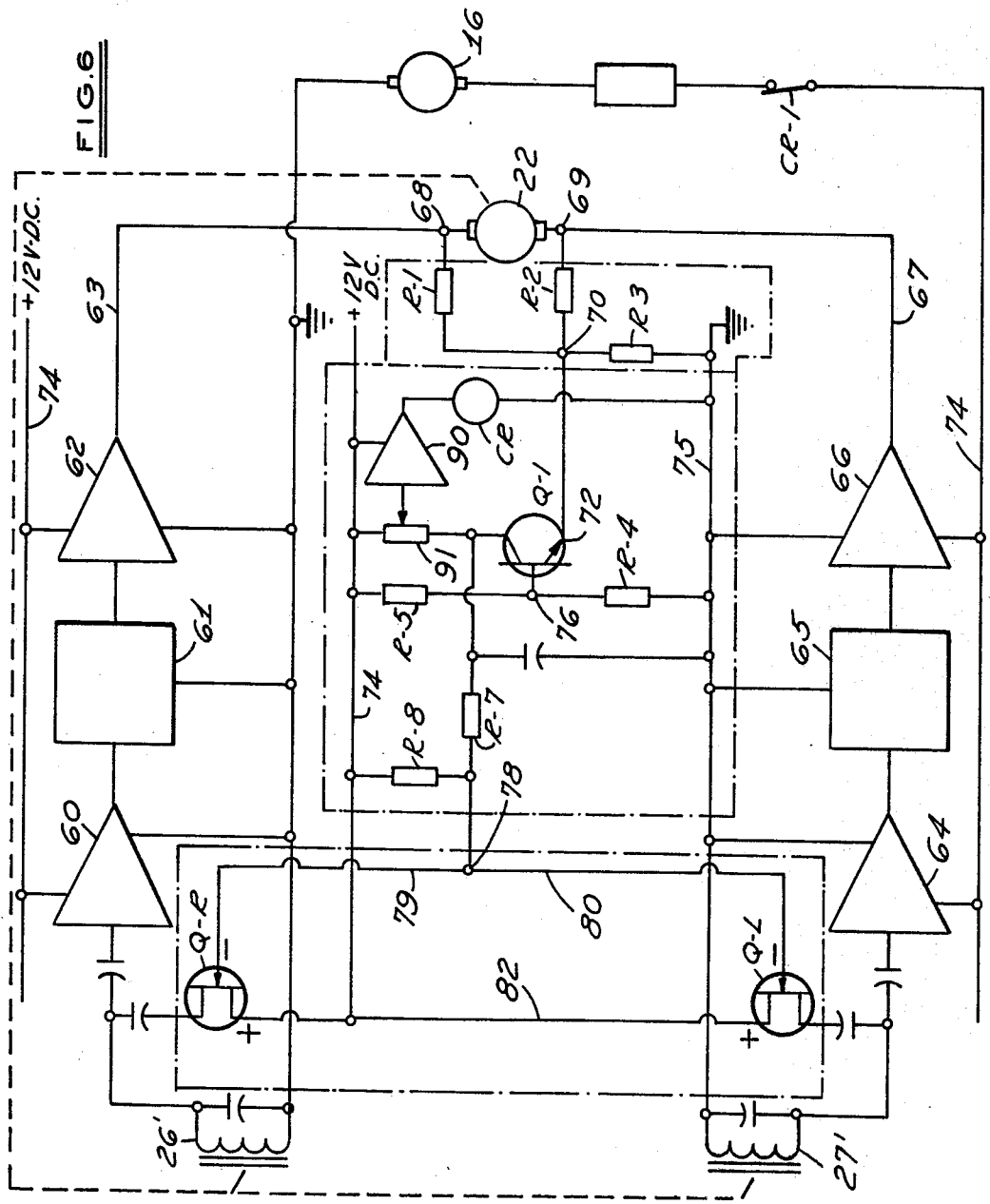

United States Patent Office 3,498,403
Patented Mar. 3, 1970

3,498,403
VEHICLE GUIDANCE CONTROL SYSTEM
James P. Kohls, Detroit, Mich., assignor to Jervis B. Webb Company, a corporation of Michigan
Filed Aug. 9, 1967, Ser. No. 659,463
Int. Cl. B60k 27/00; G05b 11/00
U.S. Cl. 180—98                    19 Claims

ABSTRACT OF THE DISCLOSURE

A vehicle guidance control system of the type wherein the steering mechanism of the vehicle is operated by a reversible driving device energized in accordance with any difference between error signals produced by left and right direction sensing units mounted on the vehicle to cause the vehicle to follow a guide path. The direction sensing units are positioned so that the sum of the error signals produced thereby is substantially constant within a range of deviation of the vehicle to either side of the guide path. The control system provides compensation for changes in the intensity of the guide path signal along the route by adjusting the error signals to maintain the sum thereof constant within the range of deviation, and to maintain the amplification of the error signals at a level such that a maximum signal difference is supplied to the steering driving device as a result of a given difference in the error signals.

BACKGROUND OF THE INVENTION

Field of the invention

This invention relates to improvements in a vehicle steering control system capable of causing a self-propelled vehicle to follow a guide path, such as may be defined by an energized guide wire, in response to error signals produced by left and right direction sensing units mounted on the vehicle.

Description of the prior art

Examples of vehicle steering control systems of the type under discussion may be found in U.S. Patents 2,339,291, 2,317,400, and 2,847,080. In each of these patents the vehicle steering mechanism is controlled so as to cause the vehicle to follow a path defined by a current conducting guide wire laid on or in the surface over which the vehicle travels. Difficulties are frequently encountered in the commercial application of these vehicle control systems, caused by variations in the intensity of the guide wire field along the guide path. Such variations may be due to localized effects of the structure in which the guide wire is laid, or to the losses and variations normally encountered in the transmission of current. Such variations in the intensity of the guide wire field will naturally effect the error signals produced by the sensing units mounted on the vehicle, and since the causes of these variations may themselves be either fixed, or variable or a combination of both, it can become extremely difficult to achieve reliable operation of the control system.

SUMMARY OF THE INVENTION

The present invention provides, in a control system for a vehicle having an automatic steering mechanism for guiding the vehicle along a guide path, automatic compensation for variations in the guide path field. The control system is of the type wherein left and right direction sensing units are mounted on the vehicle, each sensing unit being capable of producing an error sginal proportional to the extent of a deviation of the vehicle to the left and to the right of the guide path respectively, and furher including means for amplifying the error signals and controlling operation of the steering mechanism in accordance with any difference between the amplified error signals. The improved control system includes a summation network for obtaining a voltage proportional to the sum of the amplified error signals, means for comparing this summation voltage with a reference voltage and thereby obtaining a control signal proportional to any difference between said voltages, and a gain control circuit utilizing said control signal to maintain the summation voltage substantially constant.

Another feature of the invention which improves the sensitivity of a control system of this type, and which contributes to the successful operation of the automatic compensation control, is the discovery of an improved positioning for the pick-up coils of the direction sensing units mounted on the vehicle. When the coils are mounted at this improved positioning the sum of the error signals produced thereby will have a substantially constant value over a range of deviation of the vehicle to the left and to the right of the guide wire. A slight deviation beyond this range will be accompanied by a relatively great change in the sum of the error signals which change can be detected and utilized, for example, as a safety device for stopping the vehicle.

The presently preferred control system disclosed herein utilizes left and right amplifiers respectively receiving the error signals from the left and right direction sensing units with the outputs of these amplifiers being connected to a reversible steering motor, and a supply voltage furnished to each of the amplifiers from a common source. The gain control circuit is arranged to maintain the average of the outputs of these amplifiers at a level such that a maximum signal difference is supplied to the reversible steering motor in response to a given difference in the error signals; the gain control circuit preferably regulating the amplification so that the average of the output of the amplifiers is maintained at substantially one-half the supply voltage.

Other features and advantages of the invention will appear from the following description of the presently preferred embodiments thereof disclosed in the accompanying drawing.

DESCRIPTION OF THE DRAWINGS

FIG. 1 is a schematic plan view showing the principle components of a self-powered, self-guided vehicle;

FIG. 2 is an enlarged schematic elevation taken as indicated by the line 2—2 of FIG. 1 showing a preferred relation between direction sensing units on the vehicle and a guide wire;

FIG. 3 is a graph representing the error signals detected by the sensing units and the sum thereof as ordinates at left and right deviations of the sensing units from the guide wire as abscissa.

FIG. 4 is a graph showing the difference between the error signals as the ordinate, at left and right deviations from the guide wire as abscissa.

FIG. 5 is a block diagram of the control system of the invention; and

FIG. 6 is a representative circuit diagram thereof.

DESCRIPTION OF THE PREFERRED EMBODIMENTS

The vehicle 10 of FIG. 1 is equipped with a steerable front wheel 12 and a pair of rear wheels 14 driven by a drive unit 16 with power obtained from a battery 18. A control system regulates the steering action of the front wheel 12 to cause the vehicle to follow a path defined by a guide wire 20, and includes a reversible steering motor 22 connected by suitable means 24 to produce pivotal or steering movement of the wheel 12 when the motor 22 is energized. Energization of the motor 22 results from any difference between amplified error signals produced by left and right direction sensing units 27 and 26 and supplied to the motor through left and right amplifiers 28 and 29. Each of the sensing units 26 and 27 includes a pick-up coil (26', 27') respectively in which a signal may be induced from the field of the energized guide wire 20, as indicated in FIG. 2.

Any change in the guide wire field will result in a change in the error signals induced in the pick-up coils, and in the difference between the error signals for a given amount of deviation of the vehicle from the center of the guide path, and thus will cause differences in the response of the steering control for a given amount of deviation. This perhaps can be better appreciated from a preliminary consideration of FIGS. 3 and 4. In FIG. 3 the curve 30 represents the voltage induced in the right pick-up coil 26' at varying deviations of the pick-up coils to the right and left of the center of the guide path for a given guide wire field; and similarly the curve 32 represents the voltage induced in the left pick-up coil 27'. The curve 34 of FIG. 4 shows the difference between the voltages 30 and 32, and the slope of curve 34, $x/y$, indicates the gain of the steering control, or the degree of control which results from a given amount of deviation to the left or to the right of the guide path. Any change in the guide wire field will also change the voltage curves 30, 32 and 34 and the gain of the steering control; and obviously, if the changes in the guide wire field are great enough, the response of the control may become so erratic that the system is unreliable.

The sensing units 26 and 27 are positioned on the vehicle 10 by suitable means such as a bracket 36, connected to pivot with pivotal movement of the steering wheel 12, with the axes of the pick-up coils inclined forwardly and downwardly toward the guide wire according to the combined teachings of Patents 2,847,080 and 2,339,291, the forward inclination and pivotal mounting of the sensing units providing an anticipating or damping effect. I have found that if the downward inclination of the coils toward the guide wire is materially reduced, that is if the coil axes are brought much closer to a horizontal line, the shape of the error signal voltage curves 30 and 32 is changed so that these curves appear substantially as shown in FIG. 3, and a curve 40 derived from the sum of the left and right error signal voltages becomes substantially constant as indicated by the line 41 between the points 42 and 43, which is a satisfactory range of control for deviation of the vehicle to left and right of the guide path. At deviations beyond the points 42 and 43 the summation voltage curve 40 drops sharply. My work to date indicates that the optimum angle at which the axis of each of the coils 26' and 27' is positioned is on the order of ten degrees to the horizontal, "on the order of" meaning within a few degrees more or less, as the optimum angle will be effected by the horizontal and vertical distances from a pick-up coil to the guide wire. When the coils 26' and 27' are positioned with their axes at a greater angle in accordance with past practise, the summation curve 40 acquires a pronounced central dip as shown by the dash line 44 of FIG. 3.

When the error sensing units are positioned in the preferred manner described so that the sum of the error signals produced at a given guide wire field intensity remains substantially constant over the desirable range of deviation of the vehicle to the right or left of the guide path, the operation of the steering control system can be materially improved. The invention provides means for regulating or adjusting the gain of the left and right amplifiers 28 and 29 so that the sum of the amplified error signals is maintained substantially constant within the desired range of operation, and this regulation will compensate for changes in the guide wire field. In other words, this regulation will in effect maintain the slope of the differential voltage curve 34 of FIG. 4 substantially constant by producing a decreased gain in the amplifiers 28 and 29 in the event the summation voltage increases and an increased gain for a decreasing summation voltage.

A control system utilizing this mode of operation is schematically illustrated in FIG. 5. The error signals from the right and left sensing units 26 and 27 are respectively fed to the right and left amplifiers 28 and 29, and the amplifier outputs 46 and 47 are connected to the reversible steering motor 22 which is thereby energized in accordance with any difference between the outputs. A summation network 48 obtains, through connections 50 and 51, a signal proportional to the sum of the amplified error signals, compares this summation voltage with a reference voltage and produces a control signal proportional to any difference between the summation and reference voltages. This control signal is fed through a connection 52 to a gain control circuit 54 which utilizes the control signal to regulate the amplifiers 28 and 29 through feedback connections 56 and 57 respectively and maintain the summation voltage substantially constant. In this circuit the regulation supplied by the gain control circuit is shown as being applied directly to the amplifiers 28 and 29, but this is an optional mode of operation, as the regulation could also be applied either before or after amplification, if desired.

A representative circuit for accomplishing the mode of operation illustrated by FIG. 5, is shown in FIG. 6. The error signal from the right pick-up coil 26' is amplified by the combination of AC amplifier 60, detector 61 and DC amplifier 62 and is supplied as a DC voltage through connection 63 to one terminal of a reversible DC motor 22; and, in like manner the error signal from the left pick-up coil 27' is supplied to the other terminal of the motor 22 through the AC amplifier 64, detector 65, DC amplifier 66 and connection 67. The amplifiers and detectors are not shown in detail since their construction is well known, and both the AC and DC amplifiers are of the feedback type which have stable gain.

The summation network includes resistors R–1 and R–2 connected at 68 and 69 to the right and left amplifier output lines 63 and 67 respectively so that the right and left amplifier output voltages produce respectively proportional currents through resistors R–1 and R–2. The sum of the currents through resistors R–1 and R–2 appears at terminal 70 and produces a summation voltage across resistor R–3 which is proportional to the sum of the outputs of the left and right amplifiers 62 and 66. This summation voltage is applied to the terminal 72 of transistor Q–1.

Transistor Q–1 forms part of a comparison amplifier network in which a reference voltage is divided off from the vehicle supply voltage (the battery 18, FIG. 1) by resistors R–4 and R–5 connected between the positive and negative supply lines 74 and 75, the reference voltage appearing at terminal 76 and being supplied to the transistor Q–1. Transistor Q–1 thus compares the difference between the summation voltage and the reference voltage and amplifies it, and when the summation voltage is less than the reference voltage, transistor Q–1 conducts. A portion of the output of transistor Q–1 is divided off by resistors R–7 and R–8 and appears at terminal 78 as a control signal proportional to any difference between the summation and reference voltages.

The control signal is utilized in a gain control circuit including right and left field effect transistors QR and QL, being applied through connections 79 and 80 to the gate of each. These field effect transistors are either balanced or are suitably compensated by means (not shown) for any difference in their "pinch-off" voltage. The N-channel of each of the field effect transistors QR and QL is connected to the positive voltage supply line 74 by line 82. In this gain control circuit, the field effect transistors QR and QL are used as voltage-variable resistors. A negative voltage applied to the gate of each through lines 79 and 80 opposes electron flow in the N-channel. Thus when the reference voltage exceeds the summation voltage and transistor Q-1 conducts, the field effect transistors QR and QL are turned off so that no signal currents from the pick-up coils 26' and 27' are bypassed to the supply line 74. As the summation voltage increases, transistor Q-1 turns off and the field effect transistors QR and QL turn on, thereby tending to maintain the summation voltage substantially constant.

Another feature of this circuit is that the right and left amplifiers 60, 62 and 64, 66 are all connected to the same supply voltage line 74, and the gain control circuit will regulate the inputs to the amplifiers 60 and 64 so that the output of the amplifiers 62 and 66 are each maintained at an average value of one-half the supply voltage. For example, if the supply voltage in line 74 is 12 volts DC the output of each of the amplifiers 62 and 66 is maintained at an average value of 6 volts DC, regardless of variations in the guide wire field. As a result, a maximum signal difference will be supplied to the steering motor 22 in response to a given difference in the error signals.

A further feature incorporated in this circuit is a relay CR driven from the comparsion amplifier network through a DC amplifier 90 connected to the output of transistor Q-1 through a variable resistance 91. When the reference voltage exceeds the control voltage by an amount predetermined by the setting of the resistance 91 the relay CR will be energized. This may be employed in combination with a normally closed contact CR-1 in series with the vehicle drive motor 16 as a means for stopping the vehicle when the sum of the error signals produced is less than the reference voltage in the predetermined amount. Referring to FIG. 3, and as previously explained, the pick-up coils of the direction sensing units are positioned on the vehicle so that the sum of the error signals produced thereby has a substantially constant value over the range between the points 42 and 43 on the summation voltage curve 40. Any deviation of the vehicle outside of this range is accompanied by a relatively sharp drop in the summation voltage, as shown by the portions 92 and 93 of the summation voltage curve. The relay driving means can be set so that the relay CR is energized if the summation voltage falls to a level such as indicated by the line 94. It can be seen from FIG. 3 that this level of the line 94 is considerably above the lower, in-range level of the summation voltage curve 44 which would be obtained by conventional positioning of the pick-up coils and that the sensitivity of the control system is considerably improved.

While the invention has been illustrated in its application to a control system for a self-guided vehicle, it will be appreciated by those skilled in the art that the principles may be applied to other control systems in which a reversible driving device is energized in response to any difference between two amplified signals each of which is proportional to one of two error signals; and has particular application to control systems of this type wherein the error signals are derived from a common source susceptible to variation.

What is claimed is:

1. In a control system for a vehicle having an automatic steering mechanism for guiding the vehicle along a guide path, including left and right direction sensing units each capable of producing an error signal proportional to the extent of a deviation of the vehicle to the left and to the right of the guide path respectively, and further including means for amplifying the error signals and controlling operation of the steering mechanism in accordance with any difference between the amplified error signals, the improvement comprising:

a summation network for obtaining a voltage proportional to the sum of the amplified error signals, means for comparing the summation voltage with a reference voltage and obtaining a control signal proportional to any difference between said voltages, and a gain control circuit utilizing said control signal through feedback connections to the error signals to maintain said summation voltage substantially constant.

2. A control system as claimed in claim 1 wherein the guide path is defined by an energized guide wire and each of the direction sensing units includes a pick-up coil, and wherein the pick-up coils are positioned on the vehicle so that the sum of the error signals has a substantially constant value over a range of deviation of the vehicle to the left and to the right of the guide wire.

3. A control system as claimed in claim 2 wherein each pick-up coil is positioned with its axis extending toward the guide wire at an angle on the order of ten degrees to the horizontal.

4. A control system as claimed in claim 2 further comprising means for stopping the vehicle in response to the sum of the error signals being less than said substantially constant value in a predetermined amount.

5. A control system as claimed in claim 1 wherein the gain control circuit is connected to regulate the error signals prior to amplification thereof.

6. A control system as claimed in claim 1 wherein the automatic steering mechanism includes a reversible steering device and the amplifying means comprises left and right amplifiers respectively receiving the error signals as inputs with the outputs of the amplifiers regulating the operation of the steering device, means furnishing a supply voltage to each of said amplifiers, and said gain control circuit being connected to maintain the average of the outputs of said amplifiers at a level such that a maximum signal difference is supplied to the steering device in response to a given difference in the error signals.

7. A control system as claimed in claim 6 wherein the average of the outputs of said amplifiers is maintained at substantially one-half the supply voltage.

8. A control system as claimed in claim 6 wherein the means for comparing the summation voltage with a reference voltage comprises a comparison amplifier network for obtaining such reference voltage from the supply voltage and amplifying any difference between such reference voltage and the summation voltage to obtain said control signal.

9. A control system as claimed in claim 8 further including a relay driven from said comparison amplifier network in response to the reference voltage exceeding the control voltage by a predetermined amount.

10. A control system as claimed is claim 9 further comprising means for stopping the vehicle in response to energization of said relay.

11. A control system as claimed in claim 8 wherein the gain control circuit includes a pair of field effect transistors, and means supplying the amplified control signal to the gate of each of said field effect transistors.

12. A control system as claimed in claim 11 further including a connection from the supply voltage to the source of each of the field effect transistors, and a connection from the drain of each field effect transistor to the input of one of the amplifiers.

13. A control system as claimed in claim 1 further comprising means for obtaining a vehicle stopping signal in response to a predetermined amplitude of said control signal.

14. In a control system for a vehicle having an automatic steering mechanism capable of causing the vehicle to follow a path defined by an energized guide wire, including left and right direction sensing coils for producing error signals proportional to the extent of a deviation of the vehicle to the left and to the right of the guide wire, and further including means for controlling operation of the steering mechanism in accordance with any difference between the error signals the improvement comprising means positioning the direction sensing coils on the vehicle so that the sum of the error signals produced thereby has a substantially constant value over a range of deviation of the vehicle to the left and to the right of the guide wire, and circuit means for producing a control signal proportional to any difference between the sum of the error signals and a reference voltage.

15. A control system as claimed in claim 14 wherein each pickup coil is positioned with its axis extending toward the guide wire at an angle on the order of ten degrees to the horzontal.

16. A control system as claimed in claim 14 further comprising means for stopping the vehicle in response to the reference voltage exceeding the control signal by a predetermined amount.

17. In a control system in which a reversible driving devcice is energized in response to any difference between two amplified signals each proportional to one of two error signals, the improvement comprising:
   circuit means for producing a control signal proportional to any difference between the sum of the amplified signals and a reference voltage; and
   a gain control circuit utilizing said control signal to adjust the level of both amplified signals so that the sum thereof is maintained substantially constant.

18. A control system as claimed in claim 17 further comprising means for deriving each of the error signals from a common source.

19. A control system as claimed in claim 17 further comprising a supply voltage and a pair of amplifying means powered therefrom,
   means connecting each error signal to the input of one of the pair of amplifying means and the output of each amplifying means to the driving device.
   and wherein the gain control circuit is connected to maintain the average of the outputs of the pair of amplifying means at a level such that a maximum signal difference is supplied to the driving device in response to a given difference in the two error signals.

References Cited
UNITED STATES PATENTS

| | | | |
|---|---|---|---|
| 2,317,400 | 4/1943 | Paulus et al. | 180—79.1 |
| 2,339,291 | 1/1944 | Paulus et al. | 180—79.1 |
| 2,835,858 | 5/1958 | Moseley | 180—79.1 X |
| 2,847,080 | 8/1958 | Zworykin et al. | 180—98 |
| 3,017,496 | 1/1962 | Greene | 318—31 |
| 3,039,554 | 6/1962 | Hosking et al | 180—79.1 |
| 3,229,660 | 1/1966 | McLucas et al. | 180—79 |
| 3,292,168 | 12/1966 | Gray | 318—28 |

KENNETH H. BETTS, Primary Examiner

U.S. Cl. X.R.

318—18, 28